US012796592B2

(12) United States Patent
Yamauchi et al.

(10) Patent No.: US 12,796,592 B2
(45) Date of Patent: *Nov. 17, 2026

(54) MANAGEMENT DEVICE FOR CORRECTING THE POSITIONS OF A PLURALITY OF AUTONOMOUS WORKING MACHINES

(71) Applicant: HONDA MOTOR CO., LTD., Tokyo (JP)

(72) Inventors: Ken Yamauchi, Wako (JP); Hideaki Shimamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 814 days.

This patent is subject to a terminal disclaimer.

(21) Appl. No.: 17/955,573

(22) Filed: Sep. 29, 2022

(65) Prior Publication Data

US 2024/0107935 A1 Apr. 4, 2024

(51) Int. Cl.

| | |
|---|---|
| ***A01D 34/00*** | (2006.01) |
| ***A01D 101/00*** | (2006.01) |
| ***G05D 1/00*** | (2024.01) |
| ***G05D 1/248*** | (2024.01) |

(52) U.S. Cl.

CPC ......... *A01D 34/008* (2013.01); *G05D 1/0246* (2013.01); *G05D 1/0278* (2013.01); *G05D 1/0287* (2013.01); *A01D 2101/00* (2013.01); *G05D 1/248* (2024.01)

(58) Field of Classification Search

CPC .. A01D 34/008; A01D 2101/00; G05D 1/248; G05D 1/225; G05D 1/6985; G05D 1/6987; G05D 2105/15; G05D 2107/23; G05D 2109/10

See application file for complete search history.

(56) References Cited

U.S. PATENT DOCUMENTS

| | | | | |
|---|---|---|---|---|
| 2017/0357006 | A1* | 12/2017 | Öhrlund | G01C 21/165 |
| 2021/0263165 | A1* | 8/2021 | Zheng | H04W 4/40 |
| 2021/0286376 | A1* | 9/2021 | Takahashi | G05D 1/0297 |
| 2022/0099843 | A1* | 3/2022 | Kbayer | G01S 19/243 |

FOREIGN PATENT DOCUMENTS

| | | | |
|---|---|---|---|
| JP | 2001-344017 | 12/2001 | |
| WO | WO-2021239836 A1 * | 12/2021 | A01D 34/008 |

OTHER PUBLICATIONS

Machine Translation of WO-2021239836-A1 (Year: 2021).*

* cited by examiner

*Primary Examiner* — Brandon D Lee

(74) *Attorney, Agent, or Firm* — Amin, Turocy & Watson, LLP

(57) ABSTRACT

A management device includes an acquisition unit, a correction unit, and a notification unit. The acquisition unit acquires, from each of at least two of autonomous working machines, position information calculated by the autonomous working machine based on satellite signals. Based on the position information of a first autonomous working machine having relatively high positional accuracy, the correction unit corrects the position information of a second autonomous working machine having relatively low positional accuracy. The notification unit notifies the second autonomous working machine of the position information that has been corrected.

7 Claims, 6 Drawing Sheets

FIG. 4

| IDENTIFICATION INFORMATION | ACCESS INFORMATION | SPECIFICATION INFORMATION | |
|---|---|---|---|
| | | CAMERA | AZIMUTH SENSOR |
| 12_A | ··· | INCLUDED | INCLUDED |
| 12_B | ··· | NOT INCLUDED | INCLUDED |
| 12_C | ··· | INCLUDED | INCLUDED |
| 12_D | ··· | NOT INCLUDED | INCLUDED |

MANAGEMENT DEVICE FOR CORRECTING THE POSITIONS OF A PLURALITY OF AUTONOMOUS WORKING MACHINES

BACKGROUND OF THE INVENTION

Field of the Invention

The present invention relates to a management device.

Description of the Related Art

JP 2001-344017 A discloses an automatic traveling machine such as a lawn mower equipped with a GPS-based autonomous navigation system.

SUMMARY OF THE INVENTION

However, for example, when there is a building near the automatic traveling machine, it may be difficult for the automatic traveling machine to receive satellite signals. In this case, there is a concern that the accuracy of the position information calculated by the automatic traveling machine is reduced, and as a result, the traveling accuracy is reduced.

An object of the present invention is to solve the above-mentioned problem.

According to an aspect of the present invention, there is provided a management device that manages a plurality of autonomous working machines, the management device comprising: an acquisition unit configured to acquire, from each of at least two of the autonomous working machines, position information calculated by the autonomous working machine based on satellite signals; a correction unit configured to correct, based on the position information of a first autonomous working machine having a positional accuracy that is relatively high, the position information of a second autonomous working machine having the positional accuracy that is relatively low; and a notification unit configured to notify the second autonomous working machine of the position information that has been corrected.

According to the aspect of the present invention, even if there is an autonomous working machine whose satellite signal reception state is poor, it is possible to cause the autonomous working machine to accurately recognize its own position.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a diagram showing an example of device data;

DETAILED DESCRIPTION OF THE INVENTION

Figure 1:
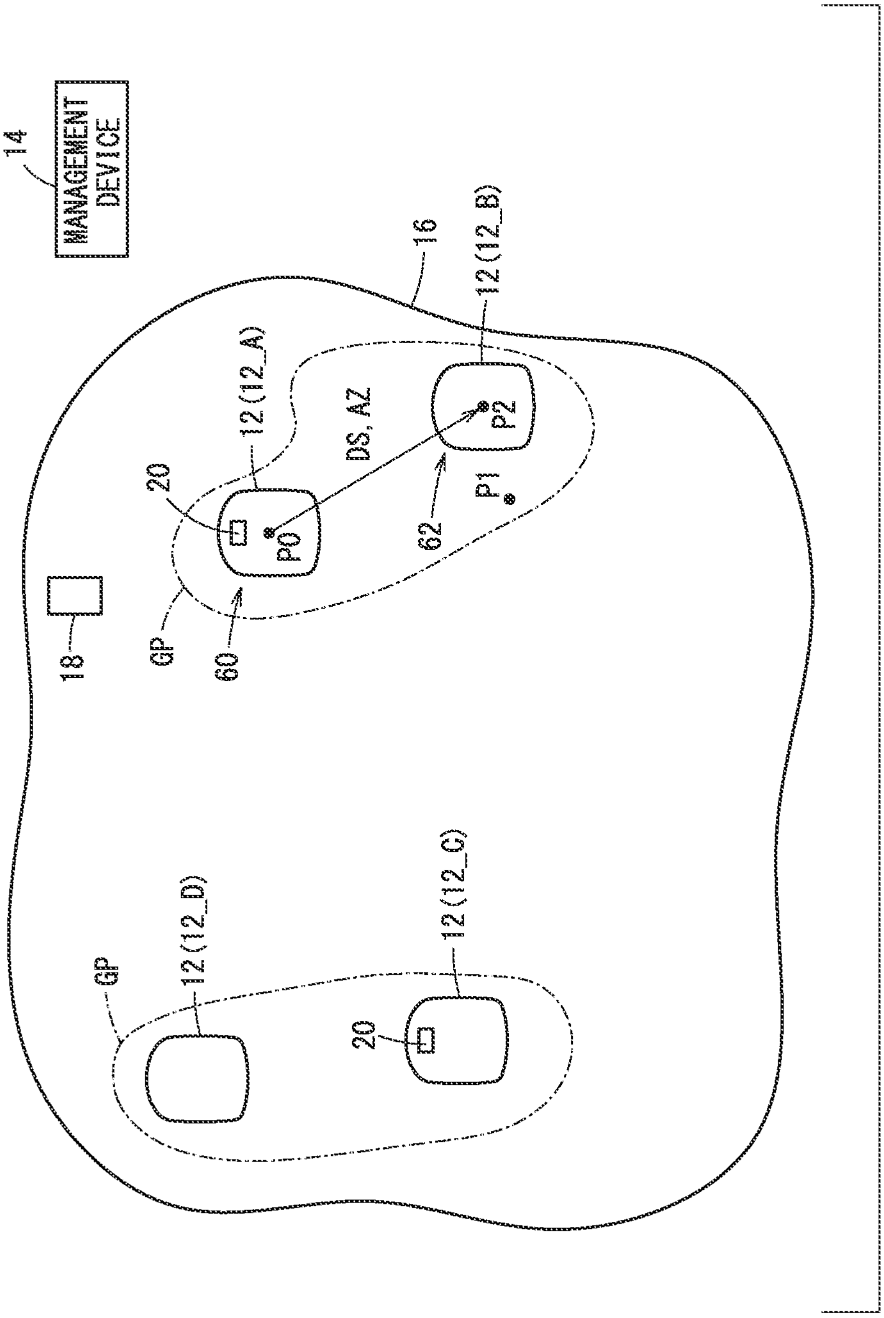
FIG. 1 is a schematic diagram showing a management system according to an embodiment of the present invention.

FIG. 1 is a schematic diagram showing a management system 10 according to an embodiment of the present invention. The management system 10 includes a plurality of autonomous working machines 12 and a management device 14. Each of the plurality of autonomous working machines 12 is disposed in a work area 16. A predetermined target 18 is disposed in the work area 16. The target 18 is a fixed object serving as a landmark. The target 18 may be disposed outside the work area 16. The target 18 may be a beacon terminal that transmits radio waves.

FIG. 1 shows an example of a case in which four autonomous working machines 12 are arranged in the work area 16. However, the number of the autonomous working machines 12 may be two, three, or five or more. Hereinafter, in order to distinguish the four autonomous working machines 12 from each other, the four autonomous working machines 12 may be referred to as an autonomous working machine 12_A, an autonomous working machine 12_B, an autonomous working machine 12_C, and an autonomous working machine 12_D.

The four autonomous working machines 12 have the same configuration except that two of the four autonomous working machines 12 are each equipped with an external sensor 20. The external sensor 20 is mounted on each of the autonomous working machine 12_A and the autonomous working machine 12_C.

Figure 2:
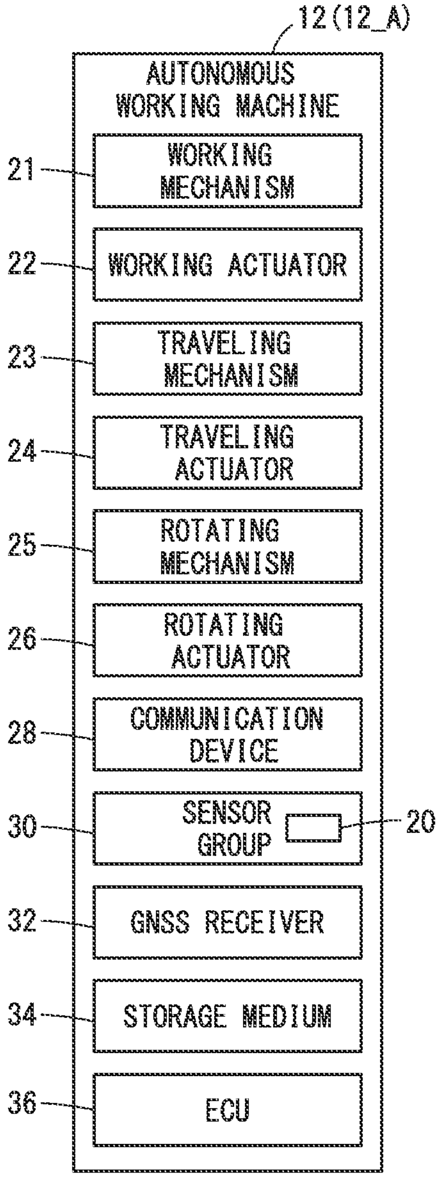
FIG. 2 is a block diagram showing a configuration of an autonomous working machine.

FIG. 2 is a block diagram showing a configuration of the autonomous working machine 12 (12_A). The autonomous working machine 12 is an unmanned working machine that performs work while autonomously traveling. Examples of the autonomous working machine 12 include a lawn mower, a grass mower, an agricultural machine, a vacuum cleaner, and a snowplow.

The autonomous working machine 12 includes a working mechanism 21, a working actuator 22, a traveling mechanism 23, a traveling actuator 24, a rotating mechanism 25, a rotating actuator 26, a communication device 28, a sensor group 30, a GNSS receiver 32, a storage medium 34, and an ECU 36.

The working mechanism 21 is a mechanism for performing work in the work area 16 (FIG. 1). For example, when the autonomous working machine 12 is a lawn mower, the working mechanism 21 includes a blade for mowing. The working actuator 22 drives the working mechanism 21 under the control of the ECU 36.

The traveling mechanism 23 is a mechanism for the autonomous working machine 12 to travel. The traveling mechanism 23 includes a traction motor. The traveling actuator 24 drives the traveling mechanism 23 under the control of the ECU 36.

The rotating mechanism 25 is a mechanism for the autonomous working machine 12 to rotate. The rotating mechanism 25 includes a rotation motor. The rotating actuator 26 drives the rotating mechanism 25 under the control of the ECU 36.

The communication device 28 includes a transmission/reception antenna, and signal processing circuitry that performs predetermined processing on a transmission signal and a reception signal. The communication device 28 communicates with the management device 14 in accordance with a predetermined wireless communication standard.

Upon receiving a transmission signal transmitted from the management device 14, the communication device 28 extracts information included in the transmission signal and outputs the extracted information to the ECU 36. Upon receiving, from the ECU 36, information to be transmitted, the communication device 28 generates a transmission signal including this information and transmits the transmission signal to the management device 14.

The sensor group 30 includes a yaw sensor, a G sensor, an azimuth sensor, a speed sensor, and the like. When the target 18 is a beacon terminal, the sensor group 30 may include a beacon receiver. The yaw sensor outputs, to the ECU 36, an angular velocity signal indicating an angular velocity (yaw rate) generated around an axis (Z-axis) in the height direction of the autonomous working machine 12. The G sensor outputs, to the ECU 36, an acceleration signal indicating accelerations in three orthogonal directions (X-axis, Y-axis, and Z-axis directions) acting on the autonomous working machine 12. The azimuth sensor outputs an azimuth signal corresponding to geomagnetism to the ECU 36. The speed sensor outputs a speed signal indicating the speed of the autonomous working machine 12 to the ECU 36. The beacon receiver outputs, to the ECU 36, a relative position signal indicating the position of the autonomous working machine 12 relative to the target 18.

The sensor group 30 further includes the external sensor 20. The external sensor 20 is a sensor that detects an external environment of the autonomous working machine 12. The external sensor 20 may be a camera or may be a LiDAR. In the present embodiment, the external sensor 20 is a camera.

The GNSS receiver 32 receives satellite signals transmitted from satellites. The GNSS receiver 32 generates satellite reception information indicating a reception result of the satellite signal and outputs the satellite reception information to the ECU 36. The satellite reception information includes satellite signals, the number of satellites from which the satellite signals are received, and the reception strength of the satellite signals.

The storage medium 34 may be constituted by a volatile memory and a nonvolatile memory. Examples of the volatile memory include a RAM and the like. Examples of the nonvolatile memory include a ROM, a flash memory, and the like. A portion of the storage medium 34 may be provided in the ECU 36. The storage medium 34 stores map data related to the work area 16 (FIG. 1), path data related to a travel path in the work area 16, schedule data of the autonomous working machine 12, a control program for controlling the autonomous working machine 12, and the like.

The ECU 36 may be constituted by one or more processors. The processor includes a CPU, a GPU, and the like. The ECU 36 calculates position information indicating the current position of the autonomous working machine 12, based on the satellite signals output from the GNSS receiver 32. The ECU 36 recognizes the current position of the autonomous working machine 12 in the work area 16, based on the position information and the map data that is stored in the storage medium 34.

The ECU 36 controls the working actuator 22, the traveling actuator 24, and the rotating actuator 26 based on the control program, the path information, and the schedule information that are stored in the storage medium 34, and various signals output from the sensor group 30. By this control, the ECU 36 causes the autonomous working machine 12 to execute predetermined work while causing the autonomous working machine 12 to travel along a predetermined travel path.

The ECU 36 controls the communication device 28 to exchange various kinds of information with the management device 14. Upon receiving a request from the management device 14, the ECU 36 executes processing in accordance with the content of the request. For example, when the content of the request is detection of the autonomous working machine 12 at a specific position by the external sensor 20 and the azimuth at the time of the detection, the ECU 36 stops the traveling mechanism 23 at the current position. In this case, the ECU 36 rotates the rotating mechanism 25 until the autonomous working machine 12 at the specific position is detected by the external sensor 20. When the rotation of the rotating mechanism 25 is finished, the ECU 36 causes the camera, which is the external sensor 20, to capture an image of the autonomous working machine 12 at the specific position, and acquires the azimuth at the time of the image capturing from the azimuth sensor. Thereafter, the ECU 36 supplies the image of the autonomous working machine 12 and the azimuth at the time of the image capturing to the management device 14 via the communication device 28.

Figure 3:
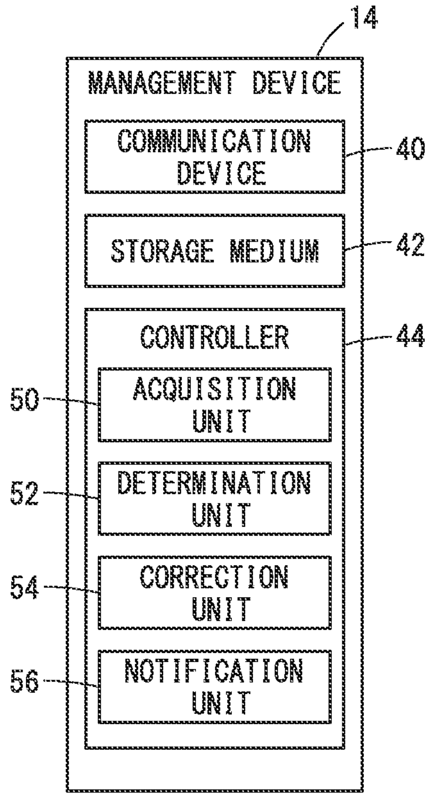
FIG. 3 is a block diagram showing a configuration of a management device.

FIG. 3 is a block diagram showing a configuration of the management device 14. The management device 14 is a device that manages the plurality of autonomous working machines 12. The management device 14 may be a server. The management device 14 includes a communication device 40, a storage medium 42, and a controller 44.

The communication device 40 includes a transmission/reception antenna, and signal processing circuitry that performs predetermined processing on a transmission signal and a reception signal. The communication device 40 communicates with the communication device 28 of each autonomous working machine 12 in accordance with a predetermined wireless communication standard. Upon receiving, from the controller 44, information to be transmitted, the communication device 40 generates a transmission signal including this information and transmits the transmission signal to each autonomous working machine 12. Upon receiving the transmission signal transmitted from the autonomous working machine 12, the communication device 40 extracts information included in the transmission signal and outputs the extracted information to the controller 44.

The storage medium 42 may be constituted by a volatile memory and a nonvolatile memory. Examples of the volatile memory include a RAM and the like. Examples of the nonvolatile memory include a ROM, a flash memory, and the like. A portion of the storage medium 42 may be provided in the controller 44. The storage medium 42 stores a position correction program for correcting the position information calculated by the autonomous working machine 12, target's position data indicating position information of the target 18 as calculated in advance based on satellite signals, and device data of each autonomous working machine 12.

FIG. 4 is a diagram showing an example of the device data. The device data includes identification information, access information, and specification information of each autonomous working machine 12. The identification information, the access information, and the specification information are registered in advance in the storage medium 42 using, for example, an input device (not shown) connected to the management device 14. The identification information is unique information assigned to the autonomous working machine 12. The access information is information necessary for connecting to and communicating with the autonomous working machine 12. The specification information is information indicating the type of the autonomous working machine 12, the presence or absence of the external sensor 20 of the sensor group 30, the type of the external sensor 20, and the like. FIG. 4 illustrates an example of a case in which the device data is a database in which the access information and the specification information are associated with the identification information.

The controller 44 may be constituted by one or more processors. The processor includes a CPU, a GPU, and the like. The controller 44 can identify each of the plurality of autonomous working machines 12 arranged in the work area 16, based on the device data stored in the storage medium 42. In addition, the controller 44 can identify the type of the sensor group 30 mounted on each autonomous working machine 12, the presence or absence of the external sensor 20, the type of the external sensor 20, and the like, based on the device data stored in the storage medium 42. In addition, the controller 44 can control the communication device 40 based on the device data stored in the storage medium 42 and exchange various kinds of information with each of the plurality of autonomous working machines 12.

The controller 44 includes an acquisition unit 50, a determination unit 52, a correction unit 54, and a notification unit 56. The acquisition unit 50, the determination unit 52, the correction unit 54, and the notification unit 56 operate when the controller 44 executes the correction program. At least a part of the acquisition unit 50, the determination unit 52, the correction unit 54, and the notification unit 56 may be realized by an integrated circuit such as an ASIC or an FPGA. Further, at least a part of the acquisition unit 50, the determination unit 52, the correction unit 54, and the notification unit 56 may be constituted by an electronic circuit including a discrete device.

The acquisition unit 50 requests each autonomous working machine 12 to transmit the position information and the satellite reception information via the communication device 40. The acquisition unit 50 acquires the position information and the satellite reception information from each autonomous working machine 12 via the communication device 40. The acquisition unit 50 stores the position information and the satellite reception information of each autonomous working machine 12 in the storage medium 42.

The determination unit 52 determines the level of positional accuracy. Specifically, the determination unit 52 determines a first autonomous working machine having relatively high positional accuracy, and a second autonomous working machine having relatively low positional accuracy. In the present embodiment, the first autonomous working machine having relatively high positional accuracy is referred to as a master working machine 60. FIG. 1 shows an example of a case in which the autonomous working machine 12_A is the master working machine 60. In the present embodiment, the second autonomous working machine having relatively low positional accuracy is referred to as a slave working machine 62. FIG. 1 shows an example of a case in which the autonomous working machine 12_B is the slave working machine 62.

The determination unit 52 determines the slave working machine 62 based on the satellite reception information of each autonomous working machine 12. For example, the determination unit 52 determines, as the slave working machine 62, the autonomous working machine 12 for which the number of satellites from which satellite signals are received is smaller than a predetermined satellite number threshold value. When there is no slave working machine 62 for which the number of satellites from which satellite signals are received is smaller than the predetermined satellite number threshold value, the determination unit 52 determines, as the slave working machine 62, the autonomous working machine 12 whose reception strength of the satellite signals is lower than a predetermined strength threshold value. When there is no autonomous working machine 12 for which the number of satellites from which satellite signals are received is smaller than the predetermined satellite number threshold value, and there is no autonomous working machine 12 whose reception strength of the satellite signals is lower than the predetermined strength threshold value, the determination unit 52 does not determine the slave working machine 62. It should be noted that there is a case in which two or more autonomous working machines 12 are determined as the slave working machines 62. However, in order to simplify the description, it is assumed in this embodiment that one autonomous working machine 12_B is determined as the slave working machine 62.

When the number of satellites from which satellite signals are received is relatively small or the reception strength of the satellite signals is relatively low, position information P1 calculated by the slave working machine 62 tends to deviate from the original position information. Therefore, when the slave working machine 62 is determined as the slave working machine 62, the traveling speed thereof may be reduced or the slave working machine 62 may be stopped.

When the slave working machine 62 exist, the determination unit 52 determines, as the master working machine 60, at least one of the plurality of autonomous working machines 12 other than the slave working machine 62. Based on the device data stored in the storage medium 42, the determination unit 52 determines the autonomous working machine 12 equipped with the external sensor 20 as the master working machine 60. When there are a plurality of the autonomous working machines 12 each equipped with the external sensor 20, the autonomous working machine 12 relatively close to the target 18 is determined as the master working machine 60. In the present embodiment, it is assumed that the autonomous working machine 12_A is determined as the master working machine 60.

The correction unit 54 corrects the position information P1 of the slave working machine 62 based on position information P0 of the master working machine 60. In the present embodiment, the correction unit 54 requests, from the master working machine 60 via the communication device 40, the detection of the slave working machine 62 by the external sensor 20 and an azimuth AZ at the time of the detection. Upon receiving the image of the slave working machine 62 and the azimuth AZ at the time of image capturing from the master working machine 60 via the communication device 40, the correction unit 54 starts correcting the position information.

The correction unit 54 recognizes the relative positional relationship (a distance DS) between the master working machine 60 and the slave working machine 62, from the image of the slave working machine 62. Thereafter, the correction unit 54 calculates corrected position information P2 based on the relative positional relationship (distance DS), the azimuth AZ at the time of image capturing, and the position information P0 of the master working machine 60. Upon calculating the corrected position information P2, the correction unit 54 corrects the position information P1 of the slave working machine 62 calculated by the slave working machine 62, to the corrected position information P2.

The notification unit 56 notifies the slave working machine 62 of the corrected position information P2 via the communication device 40. In this case, the slave working machine 62 changes the position information P1 calculated based on the satellite signals to the corrected position information P2.

Figure 5:
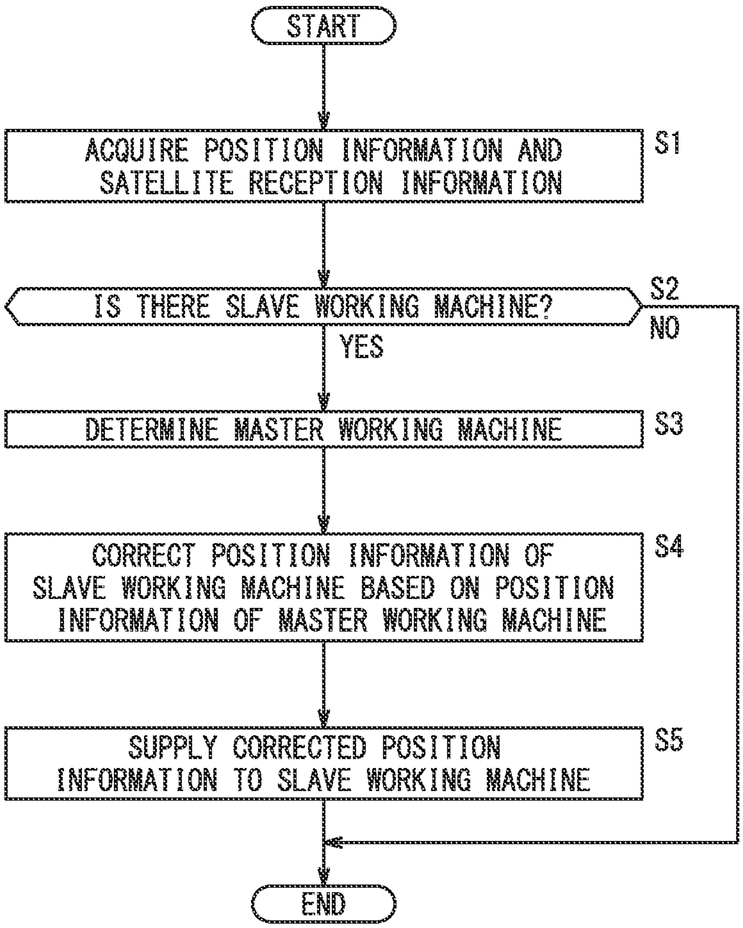
FIG. 5 is a flowchart showing a procedure of a position correction process.

FIG. 5 is a flowchart showing a procedure of a position correction process. The position correction process is a process performed by the controller 44 that executes the position correction program. The position correction process is repeatedly executed at a predetermined cycle.

In step S1, the acquisition unit 50 acquires the position information and the satellite reception information from each autonomous working machine 12 via the communication device 40. When the position information and the satellite reception information of each autonomous working machine 12 are acquired, the position correction process proceeds to step S2.

In step S2, the determination unit 52 determines whether there is a slave working machine 62 based on the satellite reception information of each autonomous working machine 12. When there is no slave working machine 62, the position correction process ends. On the other hand, when there is a slave working machine 62, the position correction process proceeds to step S3.

In step S3, based on the device data stored in the storage medium 42, the determination unit 52 determines, as the master working machine 60, one of the plurality of autonomous working machines 12 other than the slave working machine 62. When the master working machine 60 is determined, the position correction process proceeds to step S4.

In step S4, the correction unit 54 acquires the image of the slave working machine 62 and the azimuth AZ at the time of image capturing from the master working machine 60 via the communication device 40. The correction unit 54 calculates the corrected position information P2 based on the relative positional relationship (distance DS) obtained from the image of the slave working machine 62, the azimuth AZ at the time of the image capturing, and the position information P0 of the master working machine 60. Upon calculating the corrected position information P2, the correction unit 54 corrects the position information P1 calculated by the slave working machine 62, to the corrected position information P2. When the position information P1 calculated by the slave working machine 62 is corrected, the position correction process proceeds to step S5.

In step S5, the notification unit 56 notifies the slave working machine 62 of the corrected position information P2 via the communication device 40. When the slave working machine 62 is notified of the corrected position information P2, the position correction process ends.

As described above, in the case of the present embodiment, the management device 14 corrects the position information P1 of the slave working machine 62 based on the position information P0 of the master working machine 60, and notifies the slave working machine 62 of the corrected position information P2. As a result, even if there is an autonomous working machine 12 whose satellite signal reception state is poor, it is possible to cause the autonomous working machine 12 to accurately recognize its own position.

Further, in the case of the present embodiment, the management device 14 includes the determination unit 52 that determines the level of accuracy. As a result, it is possible to appropriately determine the master working machine 60 and the slave working machine 62 among the plurality of autonomous working machines 12.

Further, in the case of the present embodiment, the determination unit 52 determines, as the master working machine 60, the autonomous working machine 12 equipped with the external sensor 20. As a result, information about the relative position with respect to the slave working machine 62 can be obtained from the detection result of the external sensor 20. In addition, even if none of the plurality of autonomous working machines 12 is equipped with the external sensor 20, the position information P1 of the slave working machine 62 can be corrected.

Furthermore, in the case of the present embodiment, the determination unit 52 determines, as the slave working machine 62, the autonomous working machine 12 whose reception strength of the satellite signals is relatively low or the autonomous working machine 12 for which the number of satellites from which the satellite signals are received is relatively small. As a result, it is possible to appropriately identify the autonomous working machine 12 whose satellite signal reception state is poor.

In addition, in the case of the present embodiment, the correction unit 54 corrects the position information P1 of the slave working machine 62 based on the relative positional relationship between the master working machine 60 and the slave working machine 62 as detected by the external sensor 20, and the position information P0 of the master working machine 60. As a result, the position information P1 of the slave working machine 62 can be appropriately corrected.

The above-described embodiment may be modified as follows.

Modification 1

Figure 6:
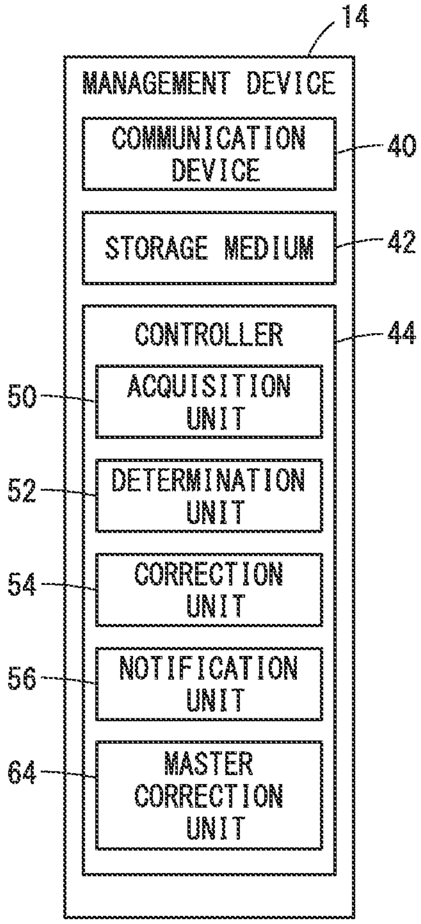
FIG. 6 is a block diagram showing a configuration of a management device according to a modification.

FIG. 6 is a block diagram showing a configuration of the management device 14 according to a modification. In FIG. 6, the same components as those described in the embodiment are denoted by the same reference numerals. In the present modification, description overlapping with that of the embodiment is omitted. In the present modification, the management device 14 further includes a master correction unit 64. When the determination unit 52 determines, as the master working machine 60, the autonomous working machine 12 relatively close to the target 18, the master correction unit 64 corrects the position information P0 of the master working machine 60.

Specifically, the master correction unit 64 requests, from the master working machine 60 via the communication device 40, the detection of the target 18 by the external sensor 20. Upon receiving the result of detection of the target 18 (the result of detection of the relative positional relationship between the master working machine 60 and the target 18) from the master working machine 60 via the communication device 40, the master correction unit 64 calculates the position information of the master working machine 60 with respect to the target 18 based on the target's position data stored in the storage medium 42. In this case, the master correction unit 64 corrects the position information P0 of the master working machine 60 acquired by the acquisition unit 50, as the position information of the master working machine 60 with respect to the target 18. As a result, the accuracy of the position of the master working machine 60 can be enhanced.

Modification 2

The determination unit 52 may determine, as the slave working machine 62, the autonomous working machine 12 that has been notified that the reception state thereof is poor. The poor reception state is detected by each autonomous working machine 12 based on the satellite reception information. For example, each autonomous working machine 12 detects that the reception state thereof is poor when the number of satellites from which satellite signals are received is smaller than a predetermined satellite number threshold value or when the reception strength of the satellite signals is lower than a predetermined strength threshold value. In this case, each autonomous working machine 12 notifies the management device 14 via the communication device 28 that the reception state is poor.

In the case of the present modification, the position correction process is executed each time the autonomous working machine 12 notifies that the reception state thereof is poor. In addition, in the case of the present modification, in step S1 (FIG. 5) of the position correction process, the acquisition unit 50 may not acquire the reception state information from each autonomous working machine 12. Therefore, it is possible to reduce the processing of the acquisition unit 50. Further, in the case of the present modification, in step S2 of the position correction process, the autonomous working machine 12 notified that the reception state thereof is poor is determined as the slave working machine 62. Therefore, in the case of the present modification, the position correction process does not end from step S2, and always proceeds to step S3. That is, in the case of the present modification, the determination unit 52 may not determine whether the slave working machine 62 exists among the plurality of autonomous working machines 12. Thus, it is possible to reduce the processing of the determination unit 52.

Modification 3

The correction unit 54 may correct the position information P1 of the slave working machine 62 when the distance DS between the master working machine 60 and the slave working machine 62 is less than a predetermined first distance threshold value. As a result, the relative positional relationship between the master working machine 60 and the slave working machine 62 can be obtained with a certain level of accuracy or higher regardless of the type of the external sensor 20.

When the distance DS between the master working machine 60 and the slave working machine 62 is equal to or greater than the predetermined first distance threshold value, the correction unit 54 does not correct the position information P1 of the slave working machine 62. In this case, the determination unit 52 may search for the autonomous working machine 12 closer to the slave working machine 62 than the current master working machine 60. When the autonomous working machine 12 closer to the slave working machine 62 than the current master working machine 60 exists, the determination unit 52 may re-determine this autonomous working machine 12 as a new master working machine 60. When there is no autonomous working machine 12 closer to the slave working machine 62 than the current master working machine 60, the notification unit 56 may issue a warning to the slave working machine 62 to the effect that the accuracy of the position information is low.

Modification 4

When the distance DS between the master working machine 60 and the slave working machine 62 is less than a second distance threshold value that is less than the predetermined first distance threshold value, the correction unit 54 may replace the position information P1 of the slave working machine 62 with the position information P0 of the master working machine 60. As a result, the accuracy of the position information of the slave working machine 62 can be matched with that of the master working machine 60 that is adjacent to this slave working machine 62.

The case in which the distance DS between the master working machine 60 and the slave working machine 62 is less than the second distance threshold value includes a case in which the master working machine 60 and the slave working machine 62 are in contact with each other. When a contact sensor that detects contact with another autonomous working machine 12 is included in the sensor group 30 of the slave working machine 62, the slave working machine 62 may notify via the communication device 28 that contact with the master working machine 60 is detected by the contact sensor. In this case, the master working machine 60 replaces the position information P1 of the slave working machine 62 with the position information P0 of the master working machine 60.

Modification 5

The determination unit 52 may determine the master working machine 60 and the slave working machine 62 for each of two or more groups GP. For example, the determination unit 52 divides the plurality of autonomous working machines 12 into groups GP with a predetermined range narrower than the work area 16, based on the autonomous working machine 12 provided with the external sensor 20. In FIG. 1, the plurality of autonomous working machines 12 are divided into two groups GP. One of the two groups GP includes the autonomous working machine 12_A provided with the external sensor 20 and the autonomous working machine 12_B adjacent to the autonomous working machine 12_A. The other of the two groups GP includes the autonomous working machine 12_C provided with the external sensor 20 and the autonomous working machine 12_D adjacent to the autonomous working machine 12_C.

In the case of the present modification, it is possible to increase the accuracy of the position information of the slave working machine 62 compared to the case where the master working machine 60 and the slave working machine 62 are determined from among the plurality of autonomous working machines 12 without dividing the autonomous working machines 12 into two or more groups GP.

The invention and effects that can be grasped from the above description will be described below.

Supplementary Note 1

The present invention provides the management device (14) that manages the plurality of autonomous working machines (12), the management device including: the acquisition unit (50) configured to acquire, from each of at least two of the autonomous working machines, the position information calculated by the autonomous working machine based on the satellite signals; the correction unit (54) configured to correct, based on the position information of the first autonomous working machine (60) having a positional accuracy that is relatively high, the position information (P1) of the second autonomous working machine (62) having the positional accuracy that is relatively low; and the notification unit (56) configured to notify the second autonomous working machine of the position information (P2) that has been corrected. As a result, even if there is an autonomous working machine whose satellite signal reception state is poor, it is possible to cause the autonomous working machine to accurately recognize its own position.

Supplementary Note 2

The management device according to Supplementary Note 1 may further include the determination unit (52) configured to determine the level of the positional accuracy. As a result, it is possible to appropriately determine the first autonomous working machine and the second autonomous working machine among the plurality of autonomous working machines.

Supplementary Note 3

In the management device according to Supplementary Note 2, the determination unit may determine, as the first autonomous working machine, the autonomous working machine equipped with the external sensor (20) configured to detect the external environment of the autonomous working machine. As a result, information about the relative position between the first autonomous working machine and the second autonomous working machine can be obtained from the detection result of the external sensor. In addition, even if none of the plurality of autonomous working machines is equipped with the external sensor, it is possible to correct the position information of the second autonomous working machine.

Supplementary Note 4

In the management device according to Supplementary Note 3, the determination unit may determine, as the first autonomous working machine, the autonomous working machine relatively close to the predetermined target (18) when there are a plurality of the autonomous working machines each equipped with the external sensor. This makes it possible to increase the accuracy of the position of the first autonomous working machine based on the position of the target.

Supplementary Note 5

In the management device according to Supplementary Note 2, the determination unit may determine, as the second autonomous working machine, the autonomous working machine whose reception strength of the satellite signals is relatively low or the autonomous working machine for which the number of satellites from which the satellite signals are received is relatively small. As a result, it is possible to appropriately identify an autonomous working machine whose satellite signal reception state is poor.

Supplementary Note 6

In the management device according to Supplementary Note 3, the correction unit may correct the position information of the second autonomous working machine based on the relative positional relationship between the first autonomous working machine and the second autonomous working machine, as detected by the external sensor and the position information of the first autonomous working machine. As a result, the position information of the second autonomous working machine can be appropriately corrected.

Supplementary Note 7

In the management device according to Supplementary Note 1, the correction unit may correct the position information of the second autonomous working machine when the distance (DS) between the first autonomous working machine and the second autonomous working machine is less than the predetermined first distance threshold value. As a result, the relative positional relationship between the first autonomous working machine and the second autonomous working machine can be obtained with a certain level of accuracy or higher regardless of the type of the external sensor.

Supplementary Note 8

In the management device according to Supplementary Note 7, the correction unit may replace the position information of the second autonomous working machine with the position information of the first autonomous working machine when the distance is less than the second distance threshold value that is less than the first distance threshold value. As a result, the accuracy of the position information of the second autonomous working machine can be matched with that of the first autonomous working machine that is adjacent to the second autonomous working machine.

The present invention is not limited to the above disclosure, and various modifications are possible without departing from the essence and gist of the present invention.

The invention claimed is:

1. A management device that manages a plurality of autonomous working machines, the management device comprising:

one or more processors configured to execute computer-executable instructions stored in memory, wherein the one or more processors execute the computer-executable instructions to cause the management device to:

acquire, from each of at least two of the autonomous working machines, position information calculated by the autonomous working machine based on satellite signals;

determine a level of positional accuracy of the position information;

correct, based on the position information of a first autonomous working machine having a positional accuracy that is relatively high, the position information of a second autonomous working machine having the positional accuracy that is relatively low;

notify the second autonomous working machine of the position information that has been corrected;

transmit to the second autonomous working machine an instruction to stop or reduce a speed of the second autonomous working machine in a case where the position information of the second autonomous working machine is corrected;

determine, as the first autonomous working machine, the autonomous working machine equipped with an external sensor configured to detect an external environment of the autonomous working machine; and determine, when there are a plurality of the autonomous working machines each equipped with the external sensor, as the first autonomous working machine, the autonomous working machine relatively close to a predetermined target, wherein in the correcting of the position information of the second autonomous working machine, a distance between the first autonomous working machine and the second autonomous working machine is recognized from an image captured by a camera of the first autonomous working machine, and the position information of the second autonomous working machine that has been corrected is calculated based on the distance, an orientation of the camera at capture of the image, and the positional information of the first autonomous working machine at capture of the image.

2. The management device according to claim 1, wherein the one or more processors execute the computer-executable instructions to cause the management device to determine, as the second autonomous working machine, the autonomous working machine whose reception strength of the satellite signals is relatively low or the autonomous working machine for which a number of satellites from which the satellite signals are received is relatively small.

3. The management device according to claim 1, wherein the one or more processors execute the computer-executable instructions to cause the management device to correct the position information of the second autonomous working machine based on relative positional relationship between the first autonomous working machine and the second autonomous working machine, and the position information of the first autonomous working machine.

4. The management device according to claim 1, wherein the one or more processors execute the computer-executable instructions to cause the management device to correct the position information of the second autonomous working machine when the distance between the first autonomous working machine and the second autonomous working machine is less than a predetermined first distance threshold value.

5. The management device according to claim 4, wherein the one or more processors execute the computer-executable instructions to cause the management device to replace the position information of the second autonomous working machine with the position information of the first autonomous working machine when the distance is less than a second distance threshold value that is less than the first distance threshold value.

6. The management device according to claim 1, wherein in the correcting of the position information of the second autonomous working machine, the first autonomous working machine is rotated until the image of the second autonomous working machine is capture by the camera.

7. A management device that manages a plurality of autonomous working machines, the management device comprising:

one or more processors configured to execute computer-executable instructions stored in memory, wherein the one or more processors execute the computer-executable instructions to cause the management device to:

acquire, from each of at least two of the autonomous working machines, position information calculated by the autonomous working machine based on satellite signals;

determine a level of positional accuracy of the position information;

correct, based on the position information of a first autonomous working machine having a positional accuracy that is relatively high, the position information of a second autonomous working machine having the positional accuracy that is relatively low;

notify the second autonomous working machine of the position information that has been corrected; and determine, as the first autonomous working machine, the autonomous working machine equipped with an external sensor configured to detect an external environment of the autonomous working machine, wherein in the correcting of the position information of the second autonomous working machine, a distance between the first autonomous working machine and the second autonomous working machine is recognized from an image captured by a camera of the first autonomous working machine, and the position information of the second autonomous working machine that has been corrected is calculated base on the distance, an orientation of the camera at capture of the image, and the positional information of the first autonomous working machine at capture of the image, and in the correcting of the position information of the second autonomous working machine, the first autonomous working machine is rotated until the image of the second autonomous working machine is capture by the camera.

* * * * *